United States Patent
Wei

(10) Patent No.: US 9,106,403 B2
(45) Date of Patent: Aug. 11, 2015

(54) FREQUENCY OFFSET ESTIMATION METHOD AND ASSOCIATED APPARATUS APPLIED TO MULTI-CARRIER COMMUNICATION SYSTEM

(71) Applicant: MStar Semiconductor, Inc., Hsinchu Hsien (TW)

(72) Inventor: Fong-Shih Wei, New Taipei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 21 days.

(21) Appl. No.: 14/037,611

(22) Filed: Sep. 26, 2013

(65) Prior Publication Data

US 2014/0093018 A1 Apr. 3, 2014

(30) Foreign Application Priority Data

Sep. 28, 2012 (TW) .............................. 101135868 A

(51) Int. Cl.
*H03D 3/24* (2006.01)
*H04L 7/04* (2006.01)
*H04L 27/26* (2006.01)

(52) U.S. Cl.
CPC ............ *H04L 7/042* (2013.01); *H04L 27/2657* (2013.01); *H04L 27/2672* (2013.01)

(58) Field of Classification Search
USPC .................................. 375/260, 316, 334, 344
See application file for complete search history.

(56) References Cited

U.S. PATENT DOCUMENTS

| 8,064,553 | B2 | 11/2011 | Gu et al. | |
|---|---|---|---|---|
| 8,149,962 | B2 | 4/2012 | Jo | |
| 2005/0094739 | A1* | 5/2005 | Takesue et al. | 375/260 |
| 2006/0062335 | A1* | 3/2006 | Lee et al. | 375/343 |
| 2010/0216459 | A1* | 8/2010 | Yu et al. | 455/434 |

FOREIGN PATENT DOCUMENTS

TW 201112699 A 4/2011

OTHER PUBLICATIONS

Taiwan Intellectual Property Office, "Office Action", Aug. 15, 2014.

* cited by examiner

*Primary Examiner* — Dac Ha
*Assistant Examiner* — Janice Tieu
(74) *Attorney, Agent, or Firm* — WPAT, PC; Justin King

(57) ABSTRACT

A frequency offset estimation method for a multi-carrier communication system is provided. The method includes: transforming a representation of a reception signal from a time domain to a frequency domain, and generating a plurality of symbols; calculating a correlation of two symbols among the symbols, and obtaining a plurality of correlating complex numbers corresponding to a plurality of subcarriers; generating M number of candidate subcarrier position sets according to a subcarrier position set of a specific signal and M number of candidate frequency offsets; calculating M number of calculated values according to the correlating complex numbers corresponding to the M number of candidate subcarrier position sets; and determining a frequency offset according to the maximum calculated value among the M number of calculated values.

8 Claims, 6 Drawing Sheets

US 9,106,403 B2

FREQUENCY OFFSET ESTIMATION METHOD AND ASSOCIATED APPARATUS APPLIED TO MULTI-CARRIER COMMUNICATION SYSTEM

This application claims the benefit of Taiwan application Serial No. 101135868, filed Sep. 28, 2012, the subject matter of which is incorporated herein by reference.

BACKGROUND OF THE INVENTION

1. Field of the Invention

The invention relates in general to a frequency offset estimation method and associated apparatus for a multi-carrier communication system, and more particularly, to a frequency offset estimation method and associated apparatus for Digital Video Broadcasting Terrestrial (DVB-T) and Integrated Services Digital Broadcasting (ISDB-T) systems.

2. Description of the Related Art

A multi-carrier communication system based on the orthogonal frequency division multiplexing (OFDM) technology is applicable to DVB-T and ISDB-T systems. In general, the OFDM technology is extremely sensitive to an offset in a carrier frequency. Due to mismatch between oscillators of a transmitter and a receiver, the frequency offset needs to be first calculated and compensated at the receiver in order to receive and correctly decode data signals.

In a DVB-T system, a continual pilot (CP) signal is utilized for estimating the frequency offset. For example, the U.S. Pat. No. 8,149,962 discloses a method for estimating a frequency shift. In certain ISDB-systems, due to an insufficient number or the lack of CP signals, the frequency offset cannot be accordingly estimated. Thus, in an ISDB-T system, the frequency offset is estimated by using a transmission and multiplexing configuration control (TMCC) signal or an auxiliary channel (AC) signal. For example, the U.S. Pat. No. 8,064,553 discloses a method for coarse frequency offset estimation in an ISDB-T receiver.

It is known from the above that, the CP signal in a DVT-T system is a specific, time-invariant real number appearing at a fixed frequency, and the TMCC signal and the AC signal in an ISDB-T system are information-carrying, time-variant real numbers appearing a fixed frequency.

Thus, the method for estimating the frequency shift as disclosed by the U.S. Pat. No. 8,149,962, involving only the CP signal for estimating the frequency shift, is applicable to a DVB-T system but not to an ISDB-T system.

Further, the method for estimating the frequency offset as disclosed by the U.S. Pat. No. 8,064,553, involving only the TMCC signal and the AC signal for determining the frequency offset, is applicable to an ISDB-T system but not to a DVB-T system.

SUMMARY OF THE INVENTION

The invention is directed to a frequency offset estimation method and associated apparatus applicable to both a DVB-T system and an ISDB-T system.

The present invention provides a frequency offset estimation method for a multi-carrier communication system. The method includes: transforming a representation of a reception signal from a time domain to a frequency domain, and generating a plurality of symbols; calculating a correlation of two symbols, and obtaining a plurality of correlating complex numbers corresponding to a plurality of subcarriers; generating M number of candidate subcarrier position sets according to a subcarrier position set of a specific signal and M number of candidate frequency offsets; calculating M number of calculated values according to the correlating complex numbers corresponding to the M number of candidate subcarrier position sets; and determining a frequency offset according to the maximum calculated value among the M number of calculated values.

The present invention further provides a frequency offset estimation apparatus for a multi-carrier communication system. The apparatus includes: a fast Fourier transform (FFT) unit, configured to transform a representation of a reception signal from a time domain to a frequency domain and generate a plurality of symbols; a buffer, configured to receive the symbols; a conjugate multiplier, configured to receive a current symbol from the FFT unit and a previous symbol from the buffer, and perform conjugate multiplication to generate a plurality of correlating complex numbers; a magnitude retrieval unit, configured to retrieve magnitudes of real parts of the correlating complex numbers; a storage unit, configured to store the magnitudes of the real parts of the correlating complex numbers; and a processor, configured to generate M number of candidate subcarrier position sets according to a subcarrier position set of a specific signal and M number of candidate frequency offsets, to calculate an M number of calculated values according to the correlating complex numbers corresponding to the M number of candidate subcarrier position sets, and to determine a frequency offset according to a maximum calculated value among the M calculated values.

The above and other aspects of the invention will become better understood with regard to the following detailed description of the preferred but non-limiting embodiments. The following description is made with reference to the accompanying drawings.

DETAILED DESCRIPTION OF THE INVENTION

An example of estimating a frequency offset using TMCC signals and AC signals in an ISDB-T system is given for explaining the present invention below. As the subcarriers where TMCC signals and AC signals are located are specified in the ISDB-T specification, a set of the above positions of the subcarriers is defined as a subcarrier position set of a specific signal. The specific signal may be a TMCC signal, an AC signal, or a TMCC signal and an AC signal. According to an embodiment of the present invention, at a receiver, a frequency offset needs to be estimated according to a known subcarrier position set of a specific signal.

Figure 1:
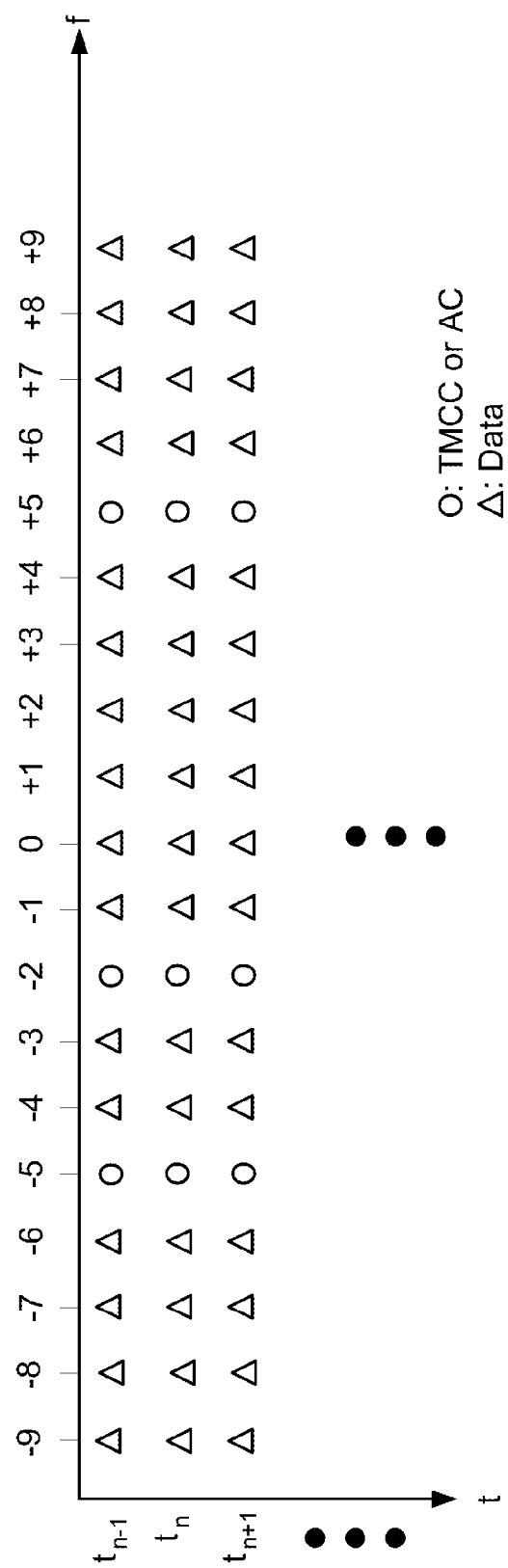
FIG. 1 is a schematic diagram of an OFDM modulation signal.

For example, after performing fast Fourier transform on a baseband signal to transform the representation of baseband signal from time domain to frequency domain, an OFDM modulation signal is as shown in FIG. 1. In FIG. 1, a symbol is received at each of the time points $t_{n-1}$, $t_n$ and $t_{n+1}$.

Referring to FIG. 1, each symbol includes 19 subcarriers. A center frequency of each symbol is set as a position "0", the subcarriers at constant intervals on frequency axis towards an increasing direction are sequentially defined as positive subcarriers, and the subcarriers at constant intervals on frequency axis towards a decreasing direction are sequentially defined as negative subcarriers. Further, signals at the subcarriers at the position "−5", "−2" and "+5" are TMCC signals or AC signals, whereas signals at the subcarriers at the remaining positions are data signals. Thus, the subcarrier position set of a specific signal is presented as (−5, −2, +5).

According to characteristics of an ISDB-T system, the TMCC signal and the AC signal are complex numbers having only a real part (i.e., imaginary part is zero) and an unknown sign, and other data signals are complex numbers having both an imaginary part and a real part. Further, the magnitudes of the TMCC signal and the AC signal are greater than the magnitudes of other data signals.

Figure 2:
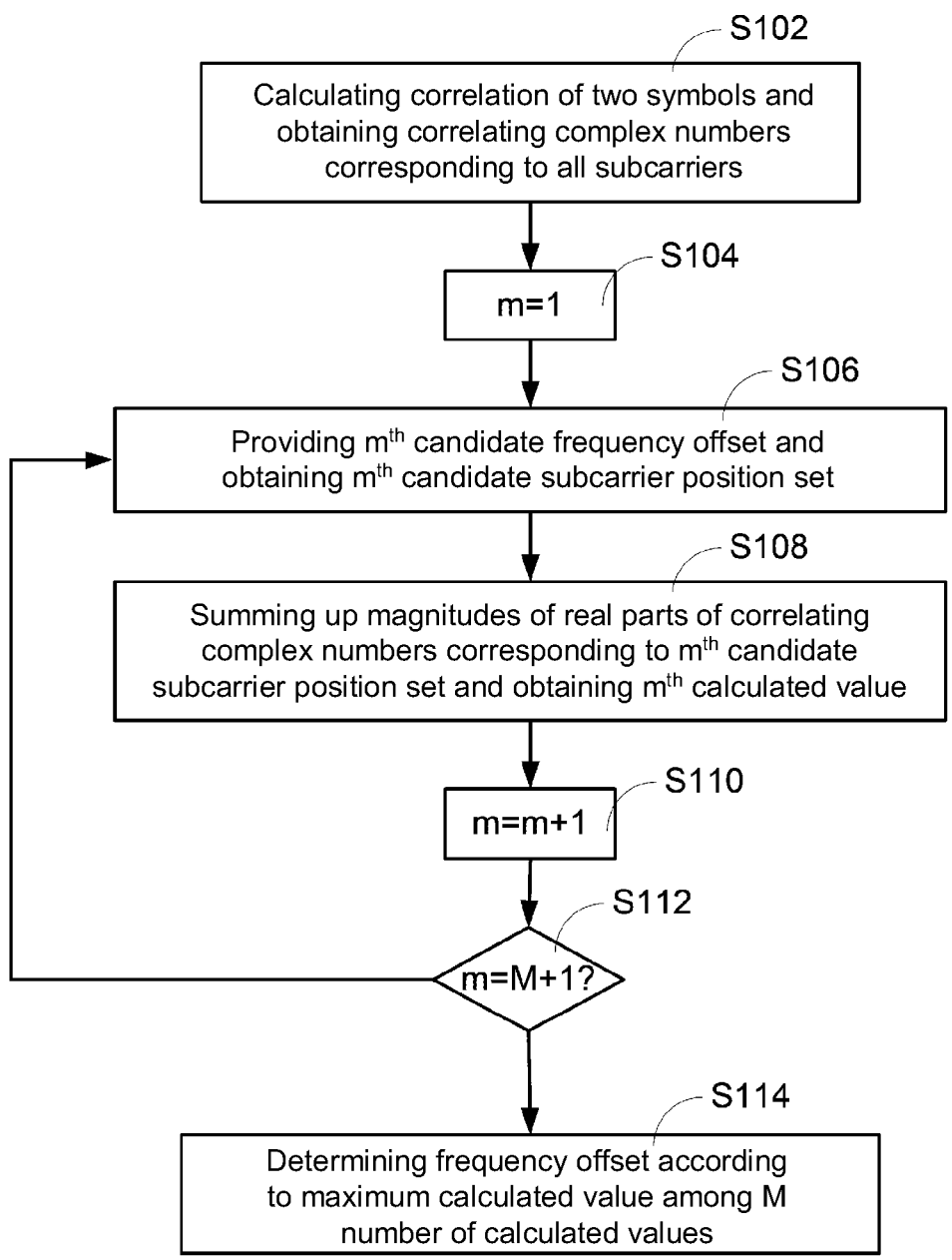
FIG. 2 is a flowchart of a frequency offset estimation method according to a first embodiment of the present invention.

Based on the above characteristics, a frequency offset estimation method is disclosed by the present invention, as shown in FIG. 2. In step S102, correlations of every two consecutive symbols are calculated, and correlating complex numbers corresponding to all the subcarriers are obtained. Each of the correlating complex numbers includes sign of the real part, value of the real part, the sign of the imaginary part, and value of the imaginary part.

From steps S104 to S112, M number of candidate frequency offsets are sequentially provided, and M number of calculated values are calculated. Associated details are given below. It is assumed that the $m^{th}$ candidate frequency offset among the M number of candidate frequency offsets is provided in the step 106.

In this embodiment, in step 104, it is assumed the process begins from m=1. Therefore, in step S106, a first candidate frequency offset is provided, and a first candidate subcarrier position set is determined according to the subcarrier position set of the specific signal. In step S108, the values of the real parts of the correlating complex numbers corresponding to the first candidate subcarrier position set are summed up to obtain a first calculated value. In Step 110, it moves on to the next candidate frequency offset, that means, now, m=m+1. Thus, $(m+1)^{th}$ candidate frequency offset is provided for calculation in the process. In step 112, it is checked whether the flow proceeds to the last one (the $M^{th}$) candidate frequency offset. As a result of theses steps, the second calculated value to the last ($M^{th}$) calculated value are similarly obtained when providing a second candidate frequency offset to an $M^{th}$ candidate frequency offset.

Having obtained the M number of calculated values, in step S114, a frequency offset is determined according to the maximum calculated value among the M number of calculated values. The candidate frequency offset corresponding to the maximum calculated value is the desired frequency offset.

Figure 3:
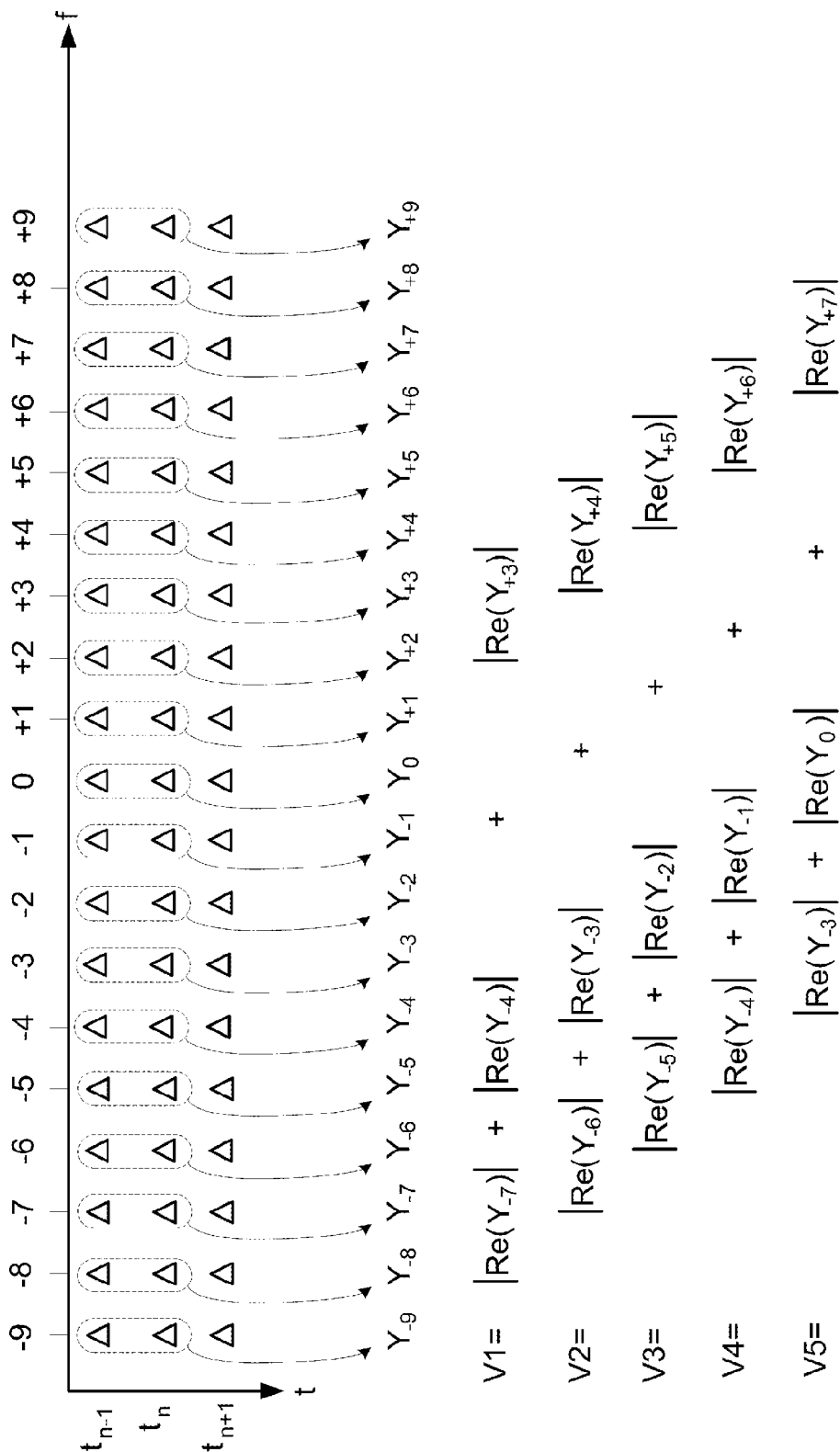
FIG. 3 is an example of the estimation according to the first embodiment.

FIG. 3 shows a practical example of the above embodiment. After a receiver performs FFT on a baseband signal to transform presentation of the baseband signal from a time domain to a frequency domain, a symbol is received at each of the time points $t_{n-1}$, $t_n$, $t_{n+1}$.

In the present invention, the correlations between every two consecutive symbols are calculated. For example, the correlation between the two symbols at the time point $t_{n-1}$ and the time point $t_n$ is calculated. A person having ordinary skill in the art may also calculate the correlation between two other consecutive time points, e.g., the two symbols at the time point $t_n$ and the time point $t_{n+1}$. The subcarrier position set (A, B, C) of the specific signal is (−5, −2, +5).

Nineteen correlating complex numbers $Y_{-9}$ to $Y_9$ corresponding to the subcarriers are generated after the correlations of every two symbols are calculated. Omitting noises and assuming a same channel gain, the correlating complex number of a $k^{th}$ subcarrier of the two symbols is:

$$Y_k = R_{n,k} \cdot R^*_{n-1,k} = |H_{n,k}|^2 \cdot X_{n,k} \cdot X_{n-1,k} \cdot e^{j(\theta_{n,k} - \theta_{n-1,k})}$$

In the above, $R_{n,k}$ and $R_{n+1,k}$ represent the magnitudes of the signals of $n^{th}$ and $(n+1)^{th}$ symbols at the $k^{th}$ subcarrier; $X_{n,k}$ and $X_{n+1,k}$ represent the magnitudes of the data signals of the $n^{th}$ and the $(n+1)^{th}$ symbols at the $k^{th}$ subcarrier; and $H_{n,k}$ and $H_{n+1,k}$ represent the channel gains of the $n^{th}$ and the $(n+1)^{th}$ symbols at the $k^{th}$ subcarrier.

Therefore, $R_{n,k} = |H_{n,k}| \cdot |X_{n,k}| \cdot e^{j\theta_{n,k}}$; $R^*_{n-1,k} = |H_{n-1,k}| \cdot |X_{n-1,k}| \cdot e^{j\theta_{n-1,k}}$, where $\theta_{n,k}$ and $\theta_{n-1,k}$ are resulted from a fine frequency offset.

After the correlation of the two symbols is calculated, magnitudes of real parts in the subcarriers of the TMCC signal and the AC signal are greater than those in the data signals. According to the ISDB-T system specification, the TMCC signal and the AC signal may be positive or negative complex numbers having only real parts (i.e., imaginary parts are zero), whereas data signals are complex numbers having both the real parts and the imaginary parts. Further, the magnitudes of the TMCC signal and the AC signal are greater than those of the data signals. Thus, in calculation of values, the signs of the real parts of the correlating complex numbers $Y_{-9}$ to $Y_9$ are omitted, and only the absolute magnitudes of the real parts of the correlating complex numbers $Y_{-9}$ to $Y_9$ are acquired.

Assume that the subcarrier position set of the specific signal is (A, B, C), and five candidate frequency offsets, e.g., −2, −1, 0, +1, and +2, are provided. Based on FIG. 2, the subcarrier position set (A, B, C) of a specific signal is (−5, −2, +5). For a person having ordinary skill in the art, a greater number of candidate frequency offsets may also be provided to similarly estimate the frequency offset.

Thus, the first candidate subcarrier position set is set as (A−2, B−2, C−2), i.e., (−7, −4, +3); the second candidate subcarrier position set is set as (A−1, B−1, C−1), i.e., (−6, −3, +4); the third candidate subcarrier position set is set as (A, B, C), i.e., (−5, −2, +5); the fourth candidate subcarrier position set is set as (A+1, B+1, C+1), i.e., (−4, −1, +6); and the fifth candidate subcarrier position set is set as (A+2, B+2, C+2), i.e., (−3, 0, +7).

The magnitudes of the real parts of the correlating complex values corresponding to the five candidate subcarrier position sets above are summed up to obtain five calculated values $V_1$ to $V_5$ as shown below.

$$V1 = |Re(Y_{-7})| + |Re(Y_{-4})| + |Re(Y_{+3})|$$

$$V2 = |Re(Y_{-6})| + |Re(Y_{-3})| + |Re(Y_{+4})|$$

$$V3 = |Re(Y_{-5})| + |Re(Y_{-2})| + |Re(Y_{+5})|$$

$$V4 = |Re(Y_{-4})| + |Re(Y_{-1})| + |Re(Y_{+6})|$$

$$V5 = |Re(Y_{-3})| + |Re(Y_{-0})| + |Re(Y_{+7})|$$

Because the magnitudes of the real pats of the TMCC signal and the AC signal are greater than those of data signals, by selecting the maximum calculated value among the five calculated values, it is ensured that the candidate frequency offset corresponding to the maximum calculated value is the desired frequency offset.

For example, by comparing the five calculated values, the fourth calculated value $V_4$ is the maximum value. Hence, the fourth candidate frequency offset (i.e., +1) is the desired frequency offset determined by the present invention. In other words, the receiver may compensate the frequency offset through adjusting a local oscillator by increasing one subcarrier frequency interval.

Figure 4:
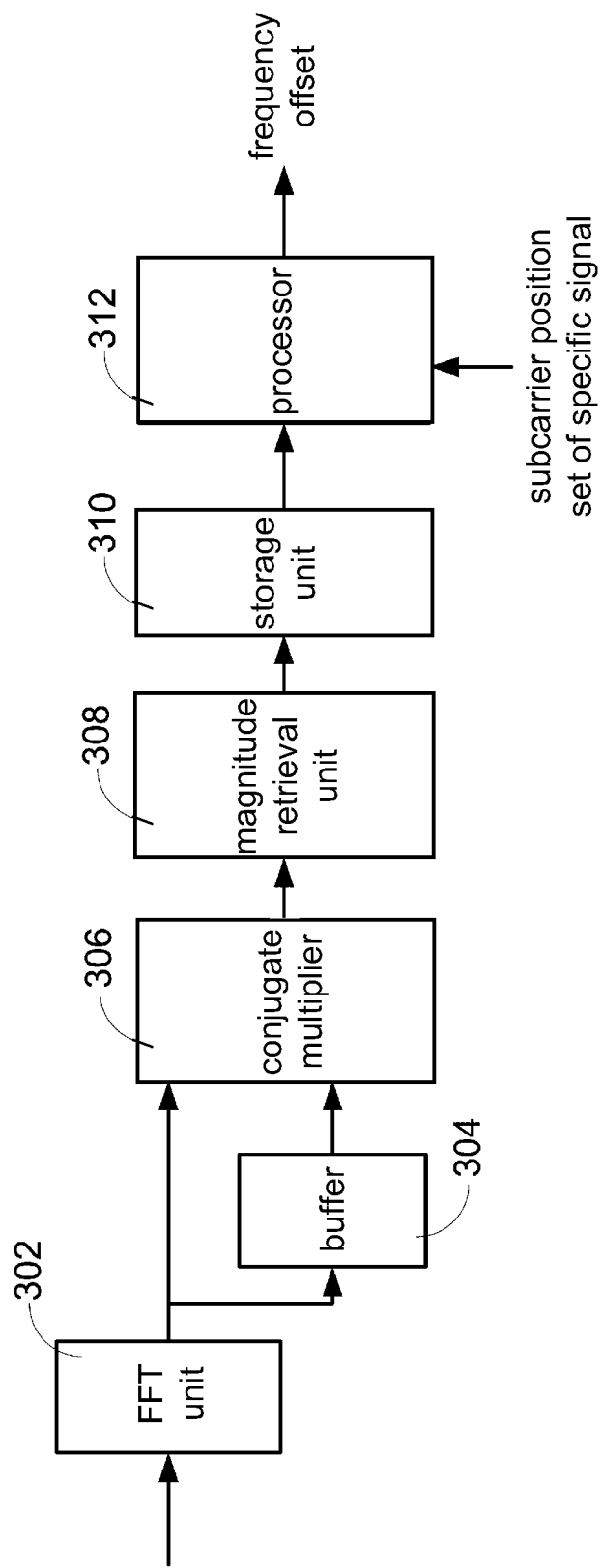
FIG. 4 is a frequency offset estimation apparatus according to the first embodiment of the present invention.

FIG. 4 shows a frequency offset estimation apparatus according to an embodiment of the present invention. The apparatus includes an FFT unit 302, a buffer 304, a conjugate multiplier 306, a magnitude retrieval unit 308, a storage unit 310 and a processor 312.

The FFT unit 302 performs FFT on a baseband signal to transform the representation of baseband signal from a time domain to a frequency domain, and sequentially generates a plurality of symbols to the buffer 304 and the conjugate multiplier 306.

The conjugate multiplier 306 calculates correlations of every two consecutive symbols. That is, the conjugate multiplier 306 performs conjugate multiplication of a current symbol with a previous symbol stored in the buffer 304 to generate a plurality of correlating complex numbers.

The magnitude retrieval unit 308 retrieves the magnitudes of the real parts of all the correlating complex numbers and stores the magnitudes to the storage unit 310. That is, the magnitude retrieval unit 308 omits the signs of the real parts, the signs of the imaginary parts and the magnitudes of the imaginary parts of the correlating complex numbers, and outputs only the magnitudes of the real parts of the correlating complex numbers.

The processor 312 generates an M number of candidate subcarrier position sets according to a known subcarrier position set of the specific signal and an M number of candidate frequency offsets. The processor 312 further accesses and adds up the corresponding values in the storage unit 310 according to the M number of subcarrier position sets to generate an M number of calculated values, and determines a frequency offset according to a maximum calculated value among the calculated values.

Figure 5:
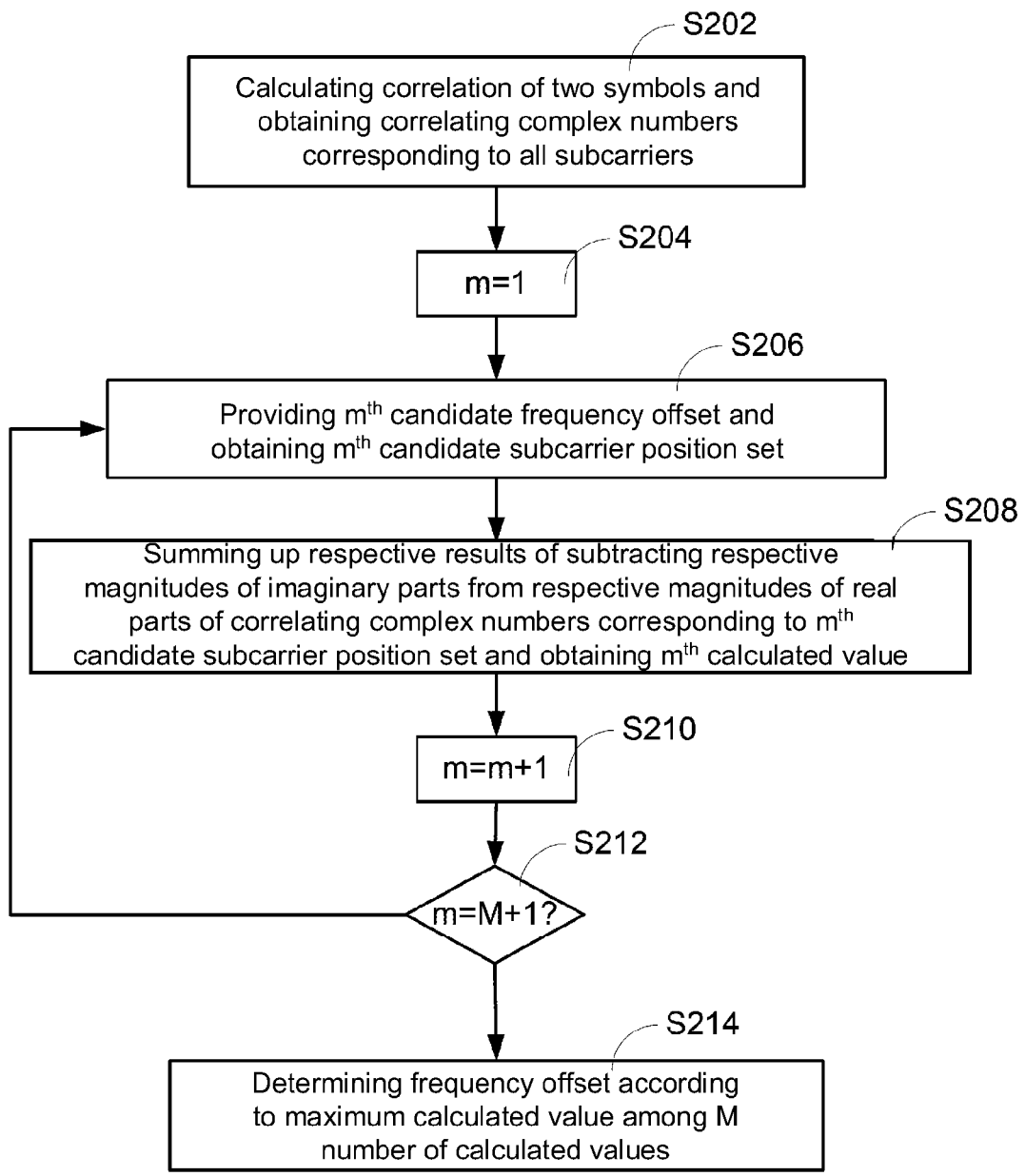
FIG. 5 is a flowchart of a frequency offset estimation method according to a second embodiment of the present invention.

To better enhance the accuracy of the frequency offset, a frequency offset estimation method is provided according to a second embodiment of the present invention, as shown in FIG. 5. A difference of the second embodiment from the first embodiment is an approach for calculating the calculated values in step S208. Details of steps S202, S204, S206, S210, S212 and S214 are identical to the corresponding steps in the first embodiment shown in FIG. 2.

According to the second embodiment of the present invention, in step S208, it calculates a summation of respective results of subtracting the respective magnitudes of the imaginary parts from the respective magnitudes of the real parts of the plurality of correlating complex numbers to obtain a first calculated value (when m=1), according to the correlating complex values of the first candidate subcarrier position set. The second calculated value to the M-th calculated value are obtained in the same way when providing the second to M-th candidate frequency offsets.

Figure 6:
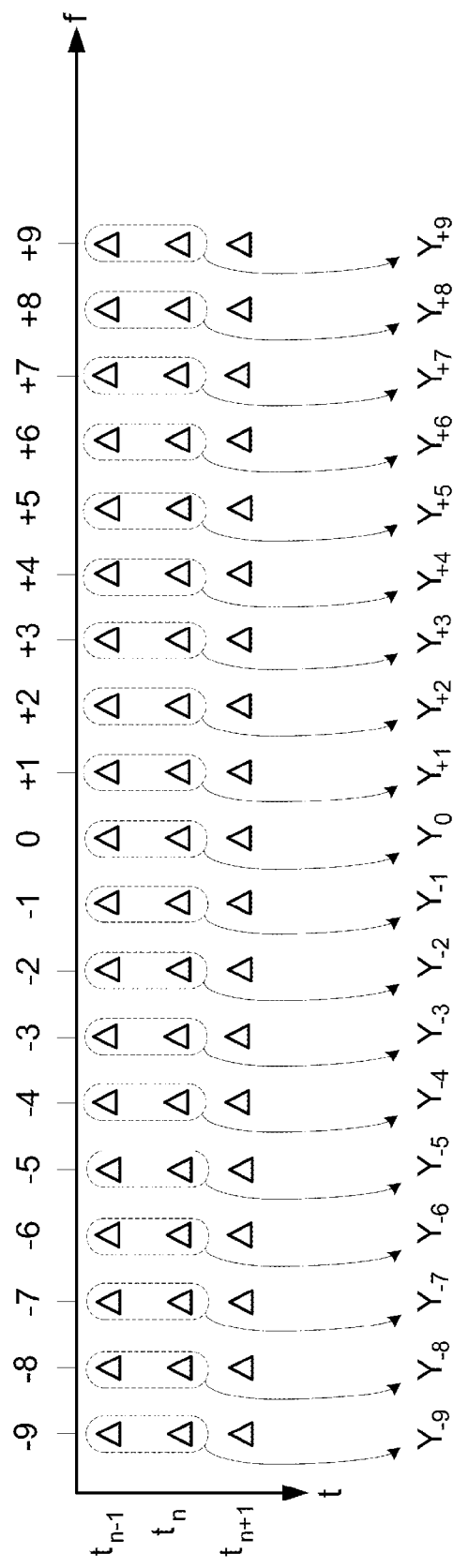
FIG. 6 is an example of the estimation according to the second embodiment.

Similarly, as shown in FIG. 6, assume that the subcarrier position set of a specific signal is (A, B, C), and five candidate frequency offsets, e.g., −2, −1, 0, +1, +2, are provided. For example, from FIG. 2, it is known that the subcarrier position set (A, B, C) of the specific signal is (−5, −2, +5).

Thus, the first candidate subcarrier position set is set as (A−2, B−2, C−2), i.e., (−7, −4, +3); the second candidate subcarrier position set is set as (A−1, B−1, C−1), i.e., (−6, −3, +4); the third candidate subcarrier position set is set as (A, B, C), i.e., (−5, −2, +5); the fourth candidate subcarrier position set is set as (A+1, B+1, C+1), i.e., (−4, −1, +6); and the fifth candidate subcarrier position set is set as (A+2, B+2, C+2), i.e., (−3, 0, +7).

The magnitudes of the real part of the correlating complex numbers corresponding to the five candidate subcarrier position sets above are added up to obtain five calculated values $V_1$ to $V_5$ below.

$$V1 = |Re(Y_{-7})| - |Im(Y_{-7})| + |Re(Y_{-4})| - |Im(Y_{-4})| + |Re(Y_{+3})| - |Im(Y_{+3})|$$

$$V2 = |Re(Y_{-6})| - |Im(Y_{-6})| + |Re(Y_{-3})| - |Im(Y_{-3})| + |Re(Y_{+4})| - |Im(Y_{+4})|$$

$$V3 = |Re(Y_{-5})| - |Im(Y_{-5})| + |Re(Y_{-2})| - |Im(Y_{-2})| + |Re(Y_{+5})| - |Im(Y_{+5})|$$

$$V4 = |Re(Y_{-4})| - |Im(Y_{-4})| + |Re(Y_{-1})| - |Im(Y_{-1})| + |Re(Y_{+6})| - |Im(Y_{+6})|$$

$$V5 = |Re(Y_{-3})| - |Im(Y_{-3})| + |Re(Y_0)| - |Im(Y_0)| + |Re(Y_{+7})| - |Im(Y_{+7})|$$

Because the magnitudes of the real parts of the TMCC signal and the AC signal are greater than those of data signals, by selecting the maximum calculated value among the five calculated values, it can be ensured that the candidate frequency offset corresponding to the maximum calculated value is the frequency offset, as desired.

For example, by comparing the five calculated values, the first calculated value $V_1$ is the maximum value. Hence, the first candidate frequency offset (−2) is the frequency offset determined by the present invention. In other words, the receiver may compensate the frequency offset through adjusting a local oscillator by decreasing two subcarrier frequency intervals.

The frequency offset estimation apparatus in FIG. 4 may be utilized to implement the second embodiment. The magnitude retrieval unit 308 retrieves the magnitudes of the real parts and the magnitudes of the imaginary parts of all the correlating complex numbers, and stores these magnitudes to the storage unit 310. That is to say, compared to the first embodiment, the magnitude retrieval unit 308 omits both the signs of the real part and the signs of the imaginary part of the correlating complex numbers, and outputs only the magnitudes of the real parts and the magnitudes of the imaginary parts of the correlating complex numbers.

The processor 312 generates M number of candidate subcarrier position sets according to a known subcarrier position set of a specific signal and M number of candidate frequency offsets. The processor 312 further accesses and adds up the corresponding results, i.e., summation of respective results of subtracting the respective magnitudes of the imaginary parts of the plurality of correlating complex numbers from the respective magnitudes of the real parts in the storage unit 310 according to the M number of subcarrier position sets to generate M number of calculated values, and determines a frequency offset according to the maximum calculated value among the calculated values.

Compared to the TMCC signal and the AC signal in an ISDB-T system, the CP signal in a DVB-T system is a time-invariant real part. That is, locations of subcarriers where the CP signal is located are specified in the DVB-T specification. Hence, the subcarrier position set may be defined as a subcarrier position set of a specific signal. In other words, in a DVB-T system, the frequency offset may be obtained through FIG. 2 or FIG. 5, so that an accurate frequency offset may be obtained according to the first embodiment and the second embodiment of the present invention.

With the above embodiments, the present invention discloses a frequency offset estimation and associated apparatus applicable to both a DVB-T system and an ISDB-T system. In the present invention, the signs of the real part and the signs of the imaginary part of the correlating complex numbers are omitted, and the magnitudes of the real part or differences of the magnitudes of the real part subtracted by the magnitudes of the imaginary part are added up to obtain the frequency offset.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frequency offset estimation method for a multi-carrier communication system, comprising:
   transforming a representation of a reception signal from a time domain to a frequency domain, and generating a plurality of symbols;
   calculating a correlation of two symbols among the symbols, and obtaining a plurality of correlating complex numbers corresponding to a plurality of subcarriers;
   generating M number of candidate subcarrier position sets according to a subcarrier position set of a specific signal and M number of candidate frequency offsets, wherein M is an integer;
   calculating M number of calculated values according to the correlating complex numbers corresponding to the M number of candidate subcarrier position sets; and
   determining a frequency offset according to a maximum calculated value among the M number of calculated values;
   wherein the step of calculating the M number of calculated values further comprises:
      providing a first candidate frequency offset, and determining a first candidate subcarrier position set according to the subcarrier position set of the specific signal; and
      summing up magnitudes of real parts of the plurality of correlating complex numbers corresponding to the first candidate subcarrier position set to obtain a first calculated value.

2. The frequency offset estimation method according to claim 1, wherein the subcarrier position set of the specific signal is a subcarrier position set of a transmission and multiplexing configuration control (TMCC) signal, a subcarrier position set of an auxiliary channel (AC) signal, or a subcarrier position set of a continual pilot (CP) signal.

3. The frequency offset estimation method according to claim 1, wherein the step of calculating the correlation of the two symbols comprises conjugate multiplying the two symbols to obtain the correlating complex numbers corresponding to the subcarriers.

4. The frequency offset estimation method according to claim 1, wherein when an $m^{th}$ calculated value obtained according to an $m^{th}$ candidate frequency offset and a corresponding $m^{th}$ candidate subcarrier position set is the maximum calculated value, the $m^{th}$ candidate frequency offset is the frequency offset, wherein m is an integer.

5. A frequency offset estimation apparatus for a multi-carrier communication system, comprising:
   a fast Fourier transform (FFT) unit, configured to transform a representation of a reception signal from a time domain to a frequency domain, and generate a plurality of symbols;
   a buffer, configured to receive the symbols;
   a conjugate multiplier, configured to receive a current symbol from the FFT unit and a previous symbol from the buffer to perform conjugate multiplication to generate a plurality of correlating complex numbers;
   a magnitude retrieval unit, configured to retrieve magnitudes of real parts of the correlating complex numbers;
   a storage unit, configured to store the magnitudes of the real parts of the correlating complex numbers; and
   a processor, configured to generate an M number of candidate subcarrier position sets according to a subcarrier position set of a specific signal and an M number of candidate frequency offsets, to calculate an M number of calculated values according to the correlating complex numbers corresponding to the M number of candidate subcarrier position sets, and to determine a frequency offset according to a maximum calculated value among the M calculated
   values, wherein M is an integer, and the processor is configured to calculate the M number of calculated values by
      determining a first candidate subcarrier position set according to a first candidate frequency offset and the subcarrier position set of the specific signal; and
      summing up the magnitudes of the real parts of the plurality of correlating complex numbers corresponding to the first candidate subcarrier position set to obtain a first calculated value.

6. The frequency offset estimation apparatus according to claim 5, wherein the subcarrier position set of the specific signal is a transmission and multiplexing configuration control (TMCC) signal, an auxiliary channel (AC) signal, or a continual pilot (CP) signal.

7. The frequency offset estimation apparatus according to claim 5, wherein when an $m^{th}$ calculated value obtained according to an $m^{th}$ candidate frequency offset and a corresponding $m^{th}$ candidate subcarrier position set is the maximum calculated value, the $m^{th}$ candidate frequency offset is the frequency offset, wherein m is an integer.

8. A frequency offset estimation method for a multi-carrier communication system, comprising:
   transforming a representation of a reception signal from a time domain to a frequency domain, and generating a plurality of symbols;
   calculating a correlation of two symbols among the symbols, and obtaining a plurality of correlating complex numbers corresponding to a plurality of subcarriers;
   generating M number of candidate subcarrier position sets according to a subcarrier position set of a specific signal and M number of candidate frequency offsets, wherein M is an integer;
   calculating M number of calculated values according to the correlating complex numbers corresponding to the M number of candidate subcarrier position sets; and
   determining a frequency offset according to a maximum calculated value among the M number of calculated values;
   wherein the step of calculating the M number of calculated values further comprises:
      providing a first candidate frequency offset, and determining a first candidate subcarrier position set according to the subcarrier position set of the specific signal; and summing up respective results of subtracting respective magnitudes of imaginary parts from the respective magnitudes of real parts of the plurality of correlating complex numbers corresponding to the first candidate subcarrier position set to obtain a first calculated value.

\* \* \* \* \*